United States Patent [19]

Hoag

[11] Patent Number: 4,849,666
[45] Date of Patent: Jul. 18, 1989

[54] ELECTROMAGNETIC ISOLATOR/ACTUATOR SYSTEM

[75] Inventor: David G. Hoag, Medway, Mass.

[73] Assignee: The Charles Stark Draper Laboratory, Inc., Cambridge, Mass.

[21] Appl. No.: 139,189

[22] Filed: Dec. 29, 1987

[51] Int. Cl.⁴ .............................................. F16C 39.06
[52] U.S. Cl. ................................... 310/90.5; 104/281; 324/207
[58] Field of Search .............. 310/90.6; 324/207, 208; 104/281, 284, 286; 244/158 R, 159, 165, 166

[56] References Cited

U.S. PATENT DOCUMENTS

| | | | |
|---|---|---|---|
| 3,865,442 | 2/1975 | Studer | 310/90.5 |
| 3,885,839 | 5/1975 | Habermann | 310/90.5 |
| 3,888,553 | 6/1975 | Wehde | 310/90.5 |
| 4,000,929 | 1/1977 | Studer | 310/90.5 |
| 4,353,602 | 8/1982 | Habermann | 310/90.5 |
| 4,692,699 | 9/1987 | Brunet | 324/207 |
| 4,709,209 | 11/1987 | Murakami | 324/207 |
| 4,732,579 | 3/1988 | Petersen | 324/207 |

FOREIGN PATENT DOCUMENTS

| | | | |
|---|---|---|---|
| 2655006 | 8/1977 | Fed. Rep. of Germany | 310/90.5 |
| 0097917 | 6/1982 | Japan | 310/90.5 |

Primary Examiner—R. Skudy
Attorney, Agent, or Firm—Lahive & Cockfield

[57] ABSTRACT

An electromagnetic suspension system for suspending a platform element with respect to a base element includes electromagnetic isolator/actuators, having a permanent magnet with a pole gap between the magnetic poles, and a coil having turns of electrically conductive material. The coil and permanent magnet are positioned so that at least a portion of each of the coil turns is within the pole gap of the permanent magnet, with the portion being aligned substantially perpendicularly to the polar axis of the permanent magnet. When electric current is applied to the coil, an electromagnetic force is generated between the coil and the permanent magnet. This force is proportional to the current and substantially independent of relative velocity of motion between the coil and the magnet.

14 Claims, 5 Drawing Sheets

| ACTUATOR LOGIC | | | | | | |
|---|---|---|---|---|---|---|
| | TORQUE | | | FORCE | | |
| COIL | X | Y | Z | X | Y | Z |
| $X_A$ | | | + | + | | |
| $X_B$ | | | − | + | | |
| $Y_A$ | + | | | | | + |
| $Y_B$ | − | | | | | + |
| $Z_A$ | | + | | + | | |
| $Z_B$ | | − | | + | | |

GAP SENSING LOGIC

| GAP | ROTATION | | | DISPLACEMENT | | |
|-----|---|---|---|---|---|---|
|     | X | Y | Z | X | Y | Z |
| $X_A$ |   | + |   |   |   | − |
| $X_B$ |   | + |   |   |   | + |
| $Y_A$ |   |   | + | − |   |   |
| $Y_B$ |   |   | + | + |   |   |
| $Z_A$ | + |   |   |   | − |   |
| $Z_B$ | + |   |   |   | + |   |

ELECTROMAGNETIC ISOLATOR/ACTUATOR SYSTEM

BACKGROUND OF THE INVENTION

This invention relates to electromagnetic suspensions and, more particularly, relates to apparatus and methods for providing an electromagnetically suspended platform isolated from external vibration and motion and independently controlled in six degrees of freedom by electromagnetic inputs.

Prior art electromagnetic suspensions are widely used in applications such as high speed train cars and low-friction bearings. Such systems utilize electromagnets suspending iron or other ferromagnetic material. Although these prior art electromagnetic suspension systems provide levitation of the element to be suspended, they do not isolate the suspended element from vibrations propagating through the base. In such systems, oscillations of the base propagate into the suspended object.

One basis for the propagation of vibration into the suspended object is the dependence of magnetic force generated by the electromagnets on relative position and velocity between the suspended object and the external frame or base. This velocity-force and position-force dependence is shared by all prior art electromagnetic suspension systems.

In an effort to decouple the suspended object from vibrations propagating through the base, some prior art isolation suspensions include gimballed tables for supporting a stable platform. Other systems include apparatus for mounting gyroscopes directly to a stable platform, measuring the vibration of the stable platform, and dynamically attempting to compensate for vibration. Neither system provides complete isolation of the suspended platform, or stable member.

It is accordingly an object of the invention to provide an electromagnetic suspension system.

It is a further object of the invention to provide an electromagnetic suspension system which has a substantially vibration-free stable platform.

It is yet another object of the invention to provide an electromagnetic suspension system which provides motion control of the suspended member in six degrees of freedom of motion.

Other general and specific objects of the invention will in part be obvious and will in part appear hereinafter.

SUMMARY OF THE INVENTION

An actuator/isolator system according to the invention provides apparatus for suspending a controlled, vibration-free "quiet" structure with respect to a vibrating "noisy" base structure. The system employs a magnetic circuit created by a permanent magnet mounted on the "noisy" structure. The magnet structure includes a plurality of pole gaps within which there exists uniform magnetic flux density. Conductor coils are situated in the magnet pole gaps and the "quiet" structure is mounted on the conductor coils.

When a constant current is passed through the conductor coils, a force is generated on the coils. This force is substantially independent of relative position or motion between the magnet and the coils, and thus is independent of the magnitude or direction of vibration of the noisy base structure. The motion-independent force between the magnet and coils provides the basis for the electromagnetic suspension and isolation features of the invention.

The system also includes actuator circuitry for driving the coils with a command force voltage signal. Current carried by the coils, and therefore resulting force on the quiet structure, is proportional to the command force voltage signal. This relationship between the command force voltage signal and resulting force on the quiet structure forms the basis for the electromagnetic actuation features of the invention.

The resulting force on the quiet structure is completely independent of vibration of the noisy base structure, to the extent that flux density is uniform in the operating region of the coil, coil resistance and associated eddy current drag forces are small, and the actuator circuit elements provide stable, very high impedance current drive.

Another aspect of the invention includes a magnetically suspended stable platform system having a base element with magnet elements for generating a magnetic field, and a platform element including conductor coils for selectively conducting electric current. When current is conducted through the conductor coils a force is generated between the current carrying coils and the magnet elements. This force, which suspends the platform element, is substantially proportional to the magnitude of the current carried in the current carrying coils, and is independent of relative position or velocity of motion between the coil and the magnet.

A further aspect of th invention includes an electromagnetic actuator/isolator system including magnet elements for generating a magnetic field, conductor coils for carrying electric current applied to the coils, actuator circuitry for applying actuator current to the coils, and gap sensing elements, for generating signals representative of gaps between the coil elements of the platform and the magnet elements of the base. The invention further includes readout logic elements, responsive to signals generated by the gap sensing elements, for generating signals representative of the gaps, and tracking logic elements, responsive to signals from an external tracking device, for generating control torque signals for controlling movement of the platform relative to the base.

In accordance with another aspect of the invention, the magnet elements and coils are interchanged so that the coils are mounted on the base structure and the magnet elements are associated with the suspended platform. Mounting the suspended platform on the magnet elements provides two further advantages. First, current can be applied directly to the coils from an external source, such as base mounted current output amplifiers, without the need for electrical conductors crossing to the stable member. This configuration thus provides electrical accessibility to the coils from base mounted current output amplifiers and minimizes physical coupling between the base and the stable member. Secondly, the mass of the magnet elements combined with the mass of the suspended platform add desirable stabilizing inertia to the suspended platform, making the suspended platform less responsive to residual vibration forces and torques.

The invention will next be described in connection with certain illustrated embodiments. However, it should be clear that various changes, modifications and additions can be made by those skilled in the art without departing from the spirit or scope of the invention as defined in the claims.

BRIEF DESCRIPTION OF THE DRAWINGS

For a fuller understanding of the nature and objects of the invention, reference should be made to the following detailed description and the accompanying drawings, in which.

Throughout this description, like reference characters in respective drawing figures are used to indicate corresponding parts.

DESCRIPTION OF ILLUSTRATED EMBODIMENTS

Figure 1A:
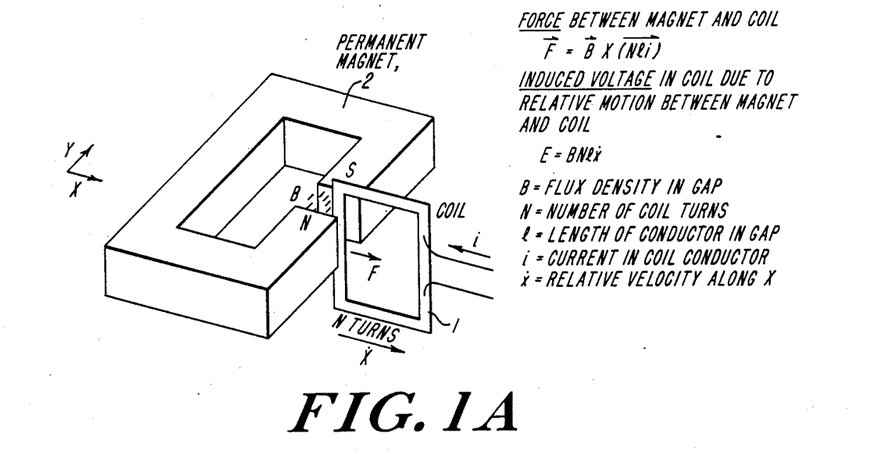
FIG. 1a is a schematic diagram illustrating the operating principles of the permanent magnet and coil elements of an electromagnetic isolator/actuator system according to the invention.

FIG. 1a is a schematic diagram illustrating the operating principles of the permanent magnet and coil elements of an electromagnetic isolator/actuator system according to the invention. Coil 1 is positioned between the North and South poles of permanent magnet 2, and a current I is applied to the N turns of coil 1. The force F between the coil 1 and the permanent magnet 2 is given by:

$$F = B \times (NLI)$$

where B is the magnetic flux density in the gap between the poles of magnet 2, and L is the length of conductor in the gap.

Those skilled in the art will understand from the above mathematical expression that the force F between magnet 2 and coil 1 is independent of relative position or velocity of motion between the coil 1 and the magnet 2. The force F is instead proportional to the magnitude of the current carried in the turns of coil 1.

Relative motion of coil 1 with respect to magnet 2 thus does not change the force F, but instead induces a voltage E in coil 1. This voltage is given by $$E = BNL(dX/dT)$$

where dX/dT is the relative velocity of coil 1 in the X direction indicated in FIG. 1a.

In accordance with the invention, coil 1 can be mounted on a structure intended to be vibration-free, such as a platform element, and the permanent magnet 2 can be mounted on a "noisy" vibrating structure. In alternative embodiments of the invention, described in greater detail hereinafter, permanent magnet 2 is mounted on the vibration-free structure or stable member, and coil 1 is mounted on the "noisy" structure or base. The force between coil 1 and magnet 2 can then be used, in a manner more fully described below, to suspend and isolate the "clean" or vibration-free structure, which can be, for example a platform element, with respect to permanent magnet 2 and the associated "noisy" or vibrating structure.

Figure 1B:
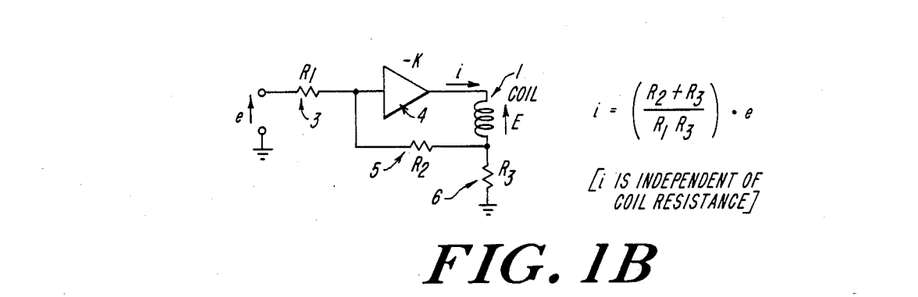
FIG. 1b is a schematic diagram of circuitry used to drive the coil elements in a suspension system according to the invention.

A preferred embodiment of the invention utilizes actuator circuitry to generate command force voltage signals. FIG. 1b is a schematic diagram of actuator circuitry utilized in a preferred embodiment of the invention.

The actuator circuitry illustrated in FIG. 1b includes coil 1, resistors 3, 5 and 6, having resistances R1, R2 and R3, respectively, and amplifier 4, having a gain of −K. A command force voltage signal "e" drives coil 1 through the amplifier network formed by resistors 3, 5 and 6 and amplifier 4.

The amplifier 4 of FIG. 1b preferably has a high gain, and the other circuit elements are selected for stable, very high impedance current drive. Those skilled in the art will understand that given very high impedance in the circuit of FIG. 1b, relative motion between coil 1 and permanent magnet 2 induces voltage E in coil 1, but does not change the current I. Accordingly, force on coil 1 remains substantially independent of relative position and motion.

This independence of force to relative position and velocity is near-complete, but is subject to reduction by induced eddy currents in the wire of coil 1. It is also reduced by variations in proportionality between force and current due to any non-uniformity of magnetic flux in the vicinity of the pole gap of permanent magnet 2. In a preferred embodiment of the invention, therefore, coil resistance and induced eddy currents are reduced in the coils by employing many turns of fine-gauge high conductivity wire. Moreover, soft iron pole pieces are employed in the permanent magnets so as to keep flux density uniform.

Figure 1C:
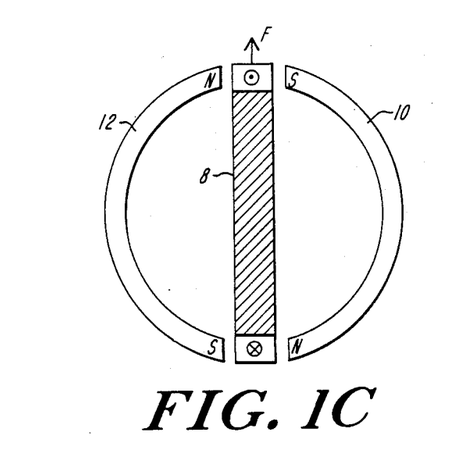
FIG. 1c is a schematic diagram of magnet and coil elements in a one-axis isolator/actuator according to the invention.

FIG. 1c is a schematic diagram of magnet and coil elements in a one-axis isolator/actuator according to the invention. Coil 8, shown in section, passes through the pole gaps of magnets 10 and 12. Current I applied to coil 8 results in force F. Magnets 10 and 12 can be mounted on a "noisy" vibrating structure, while coil 8 can be mounted on a structure to be isolated from vibration. Alternatively, magnets 10 and 12 can be mounted on a structure to be isolated from vibration, and coil 8 can be mounted on a "noisy" base structure. As discussed in greater detail hereinafter, this alternative configuration is preferred, because it increases stable member inertia and enhances electrical accessibility to the coil 8.

Figure 1D:
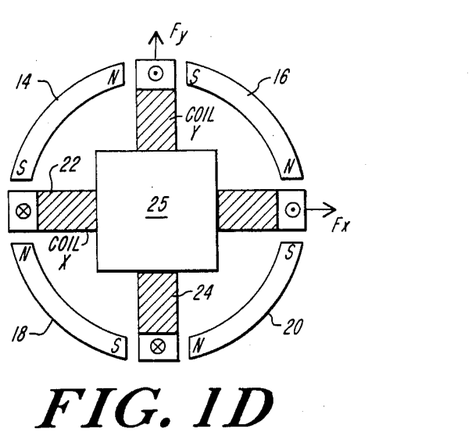
FIG. 1d is a schematic of magnet and coil elements in a two-axis isolator/actuator according to the invention.

The one-axis isolator/actuator configuration shown in FIG. 1c can be extended to a two-axis configuration, as illustrated schematically in FIG. 1d. The two-axis structure utilizes permanent magnets 14, 16, 18 and 20, together with X and Y coils 22 and 24, respectively, situated within the pole gaps and supporting a platform 25. Applying current to the coils results in orthogonal forces $F_x$ and $F_y$ along the X and Y axes, respectively, proportional to the signals applied to the X and Y coils.

An isolator/actuator according to the invention can be utilized in a variety of applications. The "quiet" suspended structure may carry, for example, a directional antenna or optical system of an orbiting spacecraft. The "noisy" vibrating structure might be a support module containing vibration sources such as cryogenic coolers and control gyroscopes.

Figure 2A:
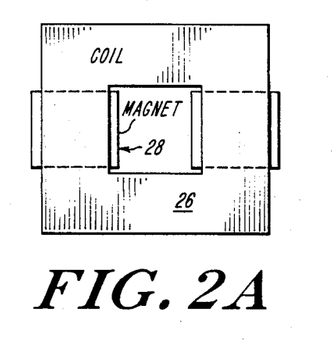
FIG. 2a is a side view of magnet and coil elements of an electromagnetic isolator/actuator according to the invention.
Figures 2A, 3A, 3B, 3C:
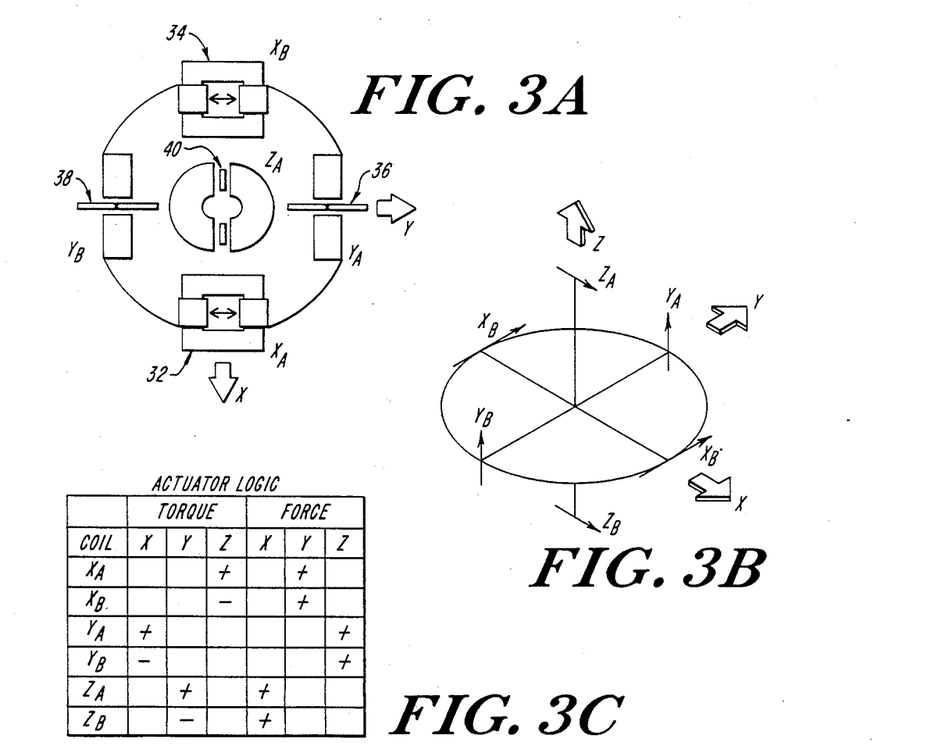
FIG. 3a is a schematic top view of the isolator/actuator system.
FIG. 3b is a schematic diagram illustrating actuator force vectors in a six degree-of-freedom isolator/actuator system in an XYZ coordinate system.
FIG. 3c illustrates actuator function required for achieving forces and torques in six degrees of freedom.
Figure 2B:
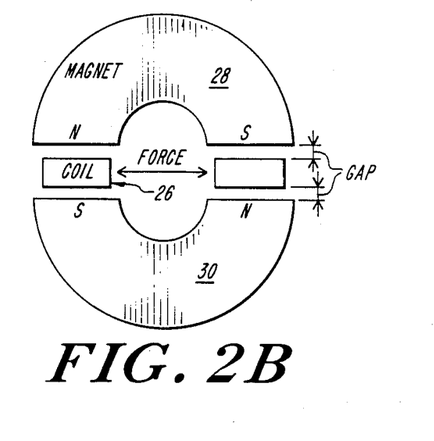
FIG. 2b is a top view of magnet and coil elements of an electromagnetic isolator/actuator according to the invention.

FIGS. 2a and 2b provides two views of a one-axis electromagnetic slator/actuator according to the invention. FIG. 2a indicates the position of coil 26 with respect to magnet 28, which is shown in section. FIG. 2b indicates how coil 26, shown in section, is situated in the pole gaps of two semi-circular magnet elements 28 and 30. The direction of force on the coil 26, as indicated in FIG. 2b is orthogonal to the North-South axis of the magnet elements.

Magnet elements 28 and 30 are preferably constructed of samarium cobalt or similar high performance permanent magnetic materials known in the art, with soft iron pole faces for uniformity of flux. The average flux density B in the gap is approximately 5 kilogauss or 0.5 weber/meter$^2$, in a preferred embodiment of the invention.

Coil 26 is constructed of N turns of conductive wire, such as copper. In one embodiment of the invention, for example, coil 26 has 8000 turns of #40 AWG copper wire. The specific resistance of #40 AWG copper wire is 0.0385 ohm/centimeter at 20° C., and with a preferred average coil length of 17 centimeters, the resistance R of coil 26 is approximately 5300 ohms. The length L of coil 26 in the pole gaps may be, for example, 0.04 meter.

Thus, the force per unit current between coil 26 and magnets 28 and 30 is $$F/I = BLN = 160 \text{ newtons/ampere}$$

In a preferred embodiment of the invention, $I=0.006$ ampere. Therefore, F=approximately 1 newton. Power dissipation at 0.006 ampere $= I^2R = 0.2$ watt.

A further preferred embodiment of the invention utilizes six magnetic isolator/actuators on a "noisy" base structure, for providing controllable forces to the "quiet" or stable structure, for three degrees of freedom of translation forces, and three degrees of freedom of rotational torques. A six degree-of-freedom configuration of isolator/actuators is illustrated in FIG. 3a. FIG. 3a is a schematic top view of the six degree-of-freedom configuration in an XYZ coordinate system. The X and Y axes are indicated by arrows.

The six degree-of-freedom system includes $X_A$ isolator/actuator 32, $X_B$ isolator/actuator 34, $Y_A$ isolator/actuator 36, $Y_B$ isolator/actuator 38, $Z_A$ isolator/actuator 40, and a $Z_B$ isolator/actuator, which, for purposes of clarity, is not shown in FIG. 3a. The illustrated isolator/actuators 32, 34, 36, 38 and 40 include magnet elements mounted on the suspended stable member, rather than on the case. Mounting the magnet elements on the stable member yields two advantages. First, current can be applied directly to the coils from an external source, such as base mounted current output amplifiers, without the need for electrical conductors crossing to the stable member. This configuration thus provides electrical accessibility to the coils from base mounted current output amplifiers and minimizes physical coupling between the base and the stable member. Secondly, the mass of the magnet combined with the mass of the suspended platform add desirable stabilizing inertia to the suspended platform, making the suspended platform less responsive to residual vibration forces and torques.

The directions of actuator force resulting from applying positive (+) signals to the X, Y and Z axis isolator/actuators of FIG. 3a are identified in FIG. 3b by the $X_A$, $X_B$, $Y_A$, $Y_B$, $Z_A$ and $Z_B$ arrows, respectively, each associated with a correspondingly identified actuator/isolator.

FIG. 3c illustrates the actuator signal sense (+ or −) which must be applied to each isolator/actuator to generate force or torque on the stable member 42 in a six degree-of-freedom system according to the invention. Generating a resulting torque about the X axis, for example, requires that a positive signal be applied to $X_A$ actuator 32, and that a negative signal be applied to $X_B$ actuator 34. Generating a force in the positive Y direction requires applying a positive signal to $X_A$ and $X_B$ actuators 32 and 34, as indicated in FIG. 3c.

Figure 4:
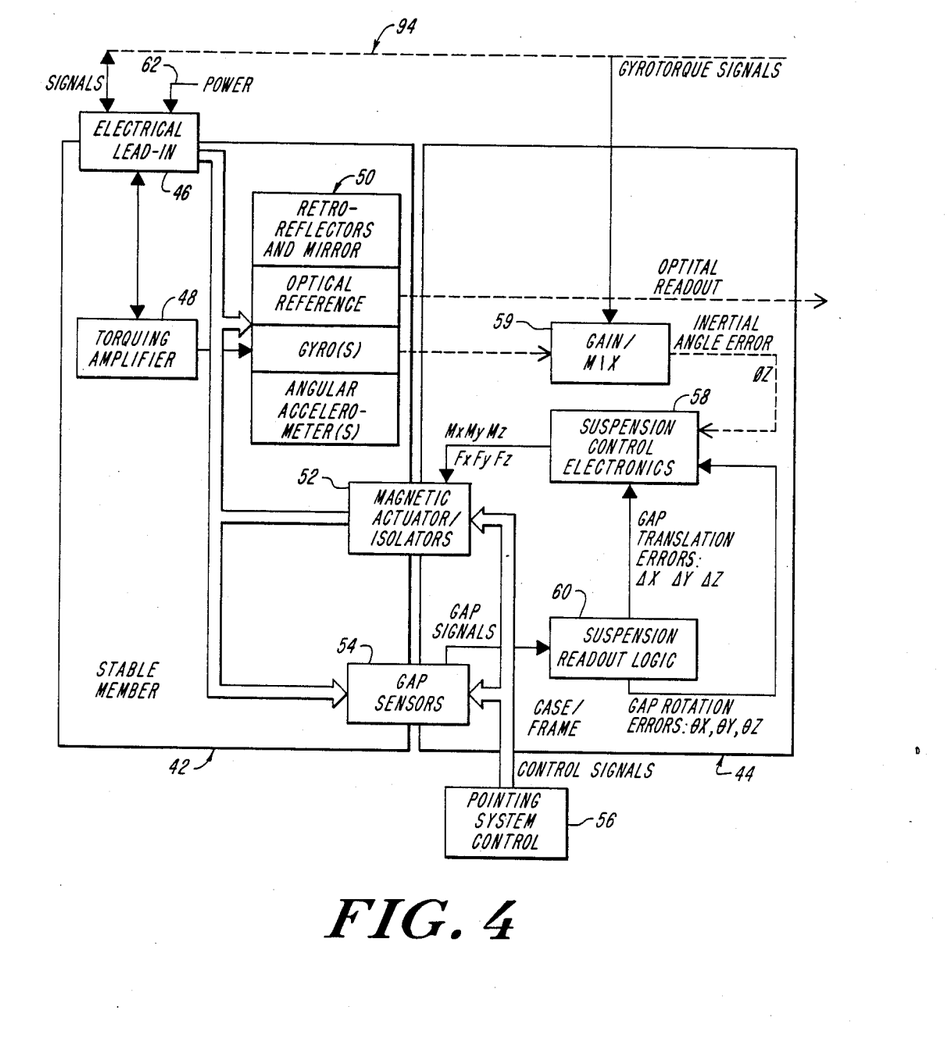
FIG. 4 is a functional block diagram of a a preferred embodiment of the invention.

FIG. 4 is a functional block diagram of a preferred embodiment of the invention. The block diagram is divided into two parts: the stable member section 42 and the base section 44. Actuator/isolators 52 suspend stable member 42 with respect to base section 44.

In the embodiment illustrated in FIG. 4, the stable member section contains the following elements: electrical lead-in block 46, gyroscope torquing amplifier 48, and a sensing block 50 including retroreflectors, optical reference devices, gyroscopes and angular accelerometers. The magnetic actuator/isolators 52 and gap sensors 54 are, as shown, the interface between the base sections 44 and the stable member 42. The base section 44 contains pointing system control 56, suspension control electronics 58 and suspension readout logic 60.

Electrical lead-in block 46 receives power over power lead-ins, and receives gyroscope torque signals from an external tracking device over line 94. The external tracking system is preferably of conventional design known in the art. The gyroscope torque signals are indicative of the spatial angular velocity of a given target being tracked.

The gyroscope torque signals which are indicated in FIG. 4 by a dashed line are preferably multiplexed on light beams or on the power lead-ins to electrical lead-in section 46. This is because while electrical conductors to the stable member are necessary to power the gyroscopes and other sensing devices, the system for crossing electrical power conductors over to the stable member 42 must be selected so as to minimize physical coupling between the stable member 42 and the base section 44. Thus, the signals are preferably multiplexed and telemetered to and from the stable member 42. All such multiplexed signals are indicated by dashed lines in FIG. 4.

Torquing amplifier 48 receives the gyroscope torque signals from electrical lead-in section 62, and amplifies the gyroscope torque signals before transmitting them out to gyroscopes in sensing block 50. The gyroscopes in sensing block 50, together with retroreflectors, optical reference devices and other angular accelerometers known in the art, measure the angular velocity of the stable member 42.

The invention may be practiced with optical reference gyroscopes. As known in the art, an optical reference gyroscope is a spinning gyroscope element driven by a flexible coupling. A mirror or collimated light source is mounted on the coupling, yielding a light source which is stable regardless of motion of the gyroscope.

The retroreflectors and optical reference devices of sensing block 50 provide optical reference/readout signals which can be used by external testing or monitoring apparatus. In particular, optical reference/readout signals provided by block 50 can be used as reference signals for precision pointing and tracking systems known in the art. The gyroscopes and other angular accelerometers of sensing block 50 provide inertial angle error signals, which are routed to suspension control electronics 58 through gain/mix element 59. Gain/mix element 59 receives gyroscope torque signals from line 94 and inertial angle error signals from gyroscopes in sensing block 50, and adjusts the amplitude of the respective signals as necessary to provide feed forward in the gyroscope stabilization loop and compensate for dynamic errors in the gyroscopes of sensing block 50.

Additionally, gap sensors 54 sense the gaps between respective coil elements and magnet elements of the magnetic actuator/isolators 52, in a manner more fully discussed hereinafter. The gap sensors 54 read the position of a respective coil element within a respective magnet gap, sense deflections of the stable member 42 from the center of the actuator/isolator gap (i.e. the null position) and generate six gap signals which are fed to suspension readout logic 60. The six gap signals represent X, Y and Z translational and angular displacement from null.

Suspension readout logic 60 converts the gap signals, in a manner more fully discussed hereinafter, into stable member translation signals $\Delta X$, $\Delta Y$, $\Delta Z$, and stable member rotation signals $\theta X$, $\theta Y$ and $\theta Z$ representative of the position and rotation of the stable member 42. The stable member translation signals and stable member rotation signals are passed to suspension control electronics 58 for processing.

A preferred embodiment of the invention provides two operational modes: an initialization mode and a stabilization mode. In the initialization mode, stable member rotation and translation displacement signals derived from the gap sensors 54 are processed by the suspension control electronics 58 to bring the stable member 42 to an orientation and translation position which zeroes all suspension gaps. Simultaneously, the gap displacement error signals generated by suspension readout logic 60 are fed back to the gyroscopes in sensing block 50 through the actuator torquing signals, to bring the gyroscope output signals to null. This initialization mode is followed by a stabilization mode.

In the stabilization mode, suspension control electronics 58, responsive to the inertial angle error signals from sensing block 50, and responsive to the stable member displacement error signals from suspension readout logic 60, transmit correction signals to the magnetic actuator/isolators 52 to rotate the stable member 42 so as to bring the gyroscope signals back to a value corresponding to their respective null positions, and simultaneously translate the stable member 42 to the null or gap-center position. These correction signals are identified in FIG. 4 as $M_x$, $M_y$, $M_z$, $F_x$, $F_y$ and $F_z$.

Pointing system control block 56 shown in FIG. 4 includes conventional antenna, optics and tracking system apparatus used to control the orientation of space-based optical devices.

It will thus be seen that the system of FIG. 4 includes elements for the closed-loop control of the magnetic actuator/isolator gaps, and for isolating and controlling the motion of the stable member 42. The actuator/isolators direct controllable forces onto the stable member structure for three degrees-of-freedom of translation forces and three degrees-of-freedom of rotational torques. In turn, the control loops illustrated in FIG. 4 provide rotational motion control of the stable member through the actuator/isolators, so as to bring the gyroscope signals to their null positions.

Additionally, it will be understood by those skilled in the art that the control loops can also control gyroscope precessional torques, and thus rotate the stable member in accordance with a target tracker so as to orient the stable member in a desired direction.

The performance of the system can be separated into three frequency regimes. At zero and low frequencies, a reference direction for the stable member is determined by the gyroscope torquing loop formed by the external tracking system, electrical lead-in 46, torquing amplifier 48 and the gyroscopes of sensing block 50, as the loop follows tracked target motions.

At intermediate frequencies, disturbance of the stable member 42 is kept extremely small by the combined action of the actuator/isolators 52 in decoupling the stable member 42 from unwanted forces, and the sensing and correction of residual motion by the gyroscopes 50 with feedback signals to the actuator/isolators 52.

At high frequencies, the intrinsic isolation of the actuator/isolators 52 in minimizing unwanted forces, together with the inertia of the stable member 42, minimize disturbances of stable member 42 orientation.

The performance of the system is in part a function of intrinsic noise in the gyroscopes of block 50 in the frequency band within which block 50 operates. Thus, the system preferably employs state-of-the-art low noise gyroscopes, which add noise on the order of 10 nanoradians RMS or less of undesired reference line motion. Inertial angular accelerometers can be employed together with the gyroscopes, as shown in sensing block 50, to provide reduced angular noise by appropriately filtering and combining signals from these two types of inertial angular sensors.

In accordance with the invention, the stable member 42 consists of a thin-walled toroid which can be machined from solid plate aluminum stock such as 6061-T6. The toroid may, for example, be a 2.0-inch deep, U-shaped ring having an inside diameter of 8.50 inches and an outside diameter of 21.75 inches. The inner wall, outer wall, base, and all webs for such a structure can be 0.063 inches thick. An open U-section structure is preferred for ease of machining. A stiffening element can be incorporated to increase the torsional and bending stiffness of the structure.

The case 44, which supports the stable member 42, can be constructed from a 3.0-inch thick 6061-T6 aluminum plate having accurately machined bores located to coincide with the six isolators/actuators mounted on the stable member, 42. These bores can serve two functions. They can provide for the accurate positioning of alignment sleeves which can be used to locate the isolator/actuator magnet assemblies 52 while they are being affixed to the stable member 42. Upon removal of these alignment sleeves, the bores can provide accurate positioning of the isolator/actuator stator coils.

Lead weights may be employed on the outside diameter of the stable member 42 as required for the balancing of the structure. The invention may be practiced in connection with a conventional mirror mount apparatus for reflecting radiant energy from a light source such as a laser. In such an embodiment, mirror housings are affixed to the outside diameter of the stable member 42.

Figure 5:
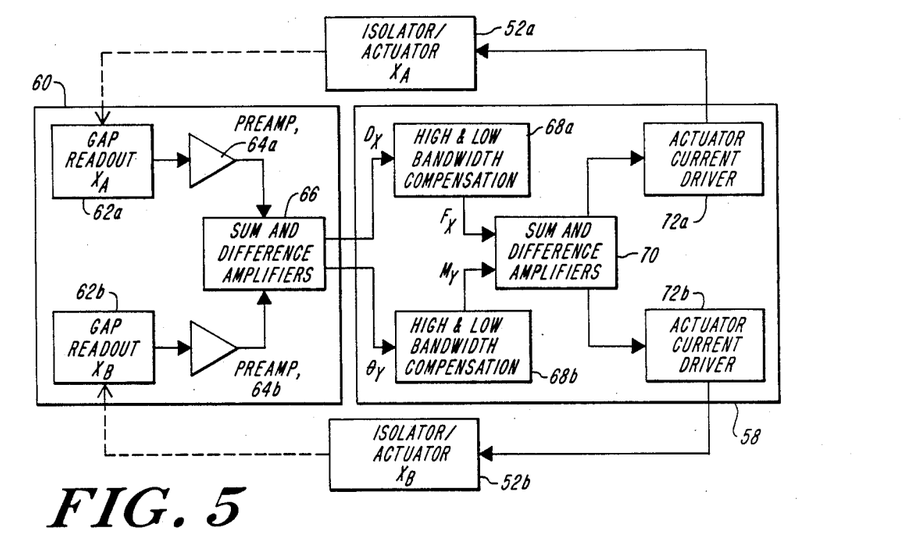
FIG. 5 is a block diagram giving detail of the suspension control and readout electronics blocks of the control circuitry of FIG. 4.

FIG. 5 is a schematic diagram giving detail of the suspension control electronics 58 and suspension readout logic 60 of FIG. 4.

The suspension control electronics 58 and readout logic 60 consist of three identical control loops, one for each pair of isolator/actuator/sensor units associated with a respective control axis (X, Y and Z) of the stable member 42. Each of these control loops, one of which is shown in FIG. 5, consists of gap or position readout electronics 62a and 62b, preamplifiers 64a and 64b, sum-and-difference amplifiers 66 and 70, high and low bandwidth compensation networks 68a and 68b and actuator driver electronics 72a and 72b.

The gap readout electronics 62a and 62b produce a measurement, along each isolator/actuator force axis, of the displacement from null of the stable member relative to its case. The gap sensing electronics preferably have sufficient sensitivity and low enough noise to provide a predetermined angle readout resolution. It is also preferred that the system not create significant elastic restraint of the stable member.

The gap readout electronics 62a and 62b, for each isolator/actuator, preferably consist of a Schaevitz linear variable differential transformer (LVDT) such as a 100 HR Series LVDT, in conjunction with a Schaevitz signal conditioner module such as SMS/GPM-109A. The LVDT is an electromechanical transducer that produces an electrical output proportional to the displacement of a separate, non-contacting, movable core which is attached, in a manner more fully discussed hereinafter, via the isolator/actuator magnet structure to the stable member. The net output of the transducer is a differential voltage which is zero when the core is at the center or null position.

Displacement of the core from this null position produces an LVDT output voltage having an amplitude proportional to core displacement and a phase (0 or 180 degrees) indicative of the direction of such displacement. In a preferred embodiment of the invention, the LVDT signal conditioner module provides 5 volts rms, 8 kHz excitation to the LVDT and provides preamplification and synchronous demodulation of the LVDT output. This module preferably also provides a stable, low output impedance DC amplifier output stage, incorporating a two-pole Butterworth low-pass having a 600 Hz cutoff frequency. Such circuitry preferably has both gain and zero suppression adjustment via external trimpots. The gain is nominally set for 40 volts DC output per centimeter of displacement.

The outputs of the gap readout electronics 62a and 62b, for a pair of isolator/actuator/sensing units, are applied to low-noise, unity-gain differential preamplifiers 64a and 64b providing high common-mode noise rejection. The preamplified gap signals are preferably made available, at this point, for monitoring via unity-gain buffer amplifiers. These signals are also applied to unity-gain sum-and-difference amplifiers 66 whose outputs represent a measure of the displacement and rotation of the stable member from the null position.

Those skilled in the art will understand that a summation of the gap signals provides the measure of displacement, and a differencing of these signals provides the measure of rotation. The sum-and-difference amplifier outputs preferably are also made available for monitoring via unity-gain buffers. The displacement and rotation error signals are then applied to high and low bandwidth compensation networks 68a and 68b which can be of conventional design and construction, and which can be switched between high and low bandwidth modes of operation, preferably providing selectable closed-loop bandwidths of 200 Hz and 0.5 Hz, respectively. Low frequency integration is also preferably provided by these compensation networks.

The compensated error signals, now representing the restoring force and torque to be applied to the stable member, are applied to unity-gain sum-and-difference amplifiers 70, known in the art, in order to create signals of appropriate manitude and polarity for application to the coils of the isolator/actuators. Provision for the summation of externally generated forcing functions is made in the circuitry associated with these sum-and-difference amplifiers 70.

Signals are applied to the isolator/actuator coils via the actuator driver electronics 72a and 72b. The function of these drivers is to provide a voltage-controlled bilateral current source for each of the isolator/actuators 52a and 52b. In the interests of minimizing stable member-to-case angle disturbances, this current source preferably has extremely low noise characteristics and provides a very high output impedance at the stator coil terminals. The circuitry for these drivers preferably consists of an ultra-low noise operational amplifier input stage such as PMIOP-27, driving a power op-amp output stage, such as an Apex Micro-Tech PA10A, providing a combined gain below 200 Hz of greater than 170 dB.

In such an embodiment, the output power stage is capable of operating from differential supply voltages up to 100 volts and provides output current limiting by a selection of external resistors. The output impedance of the driver circuitry is preferably greater than 300 megohms for frequencies below 200 Hz.

Figure 6A:
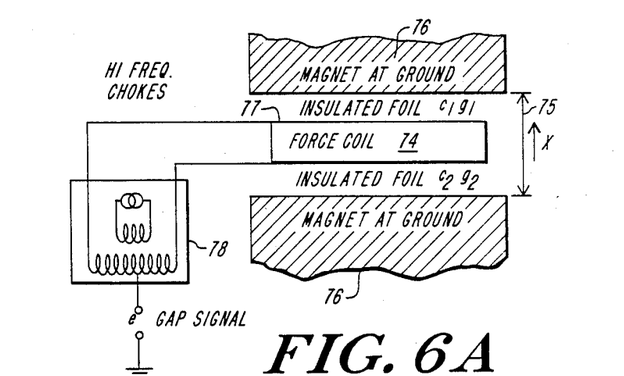
FIG. 6a is a schematic diagram illustrating the operating principle of gap sensors according to the invention.

FIG. 6a is a schematic diagram of another embodiment of gap sensors according to the invention, illustrating the operating principle of the gap sensors 54 of FIG. 4. Inductor element 78 is in circuit with capacitor foils 77 mounted on force coil 74. Force coil 74 and the capacitors formed by capacitor foils 77 are situated in the gap 75 of magnet 76. It will be understood by those skilled in the art that a gap signal E is generated at the output of inductor element 78 when force coil 74 is displaced in the gap 75 of magnet 76.

Figure 6B:
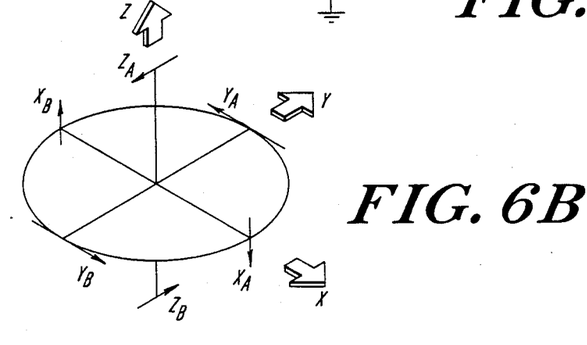
FIG. 6b is a schematic diagram illustrating gap sensing directions for a six degree-of-freedom isolator/actuator system in an XYZ coordinate system.

FIG. 6b is a schematic diagram illustrating preferred gap sensing directions, in an XYZ coordinate system, provided by gap sensors 54 in a six degree-of-freedom isolator/actuator system. The X, Y and Z directions are illustrated in FIG. 6b by large arrows. The orthogonal gap sensing directions are identified by the $X_A$, $X_B$, $Y_A$, $Y_B$, $Z_A$ and $Z_B$ arrows, respectively, each associated with a correspondingly-identified gap sensor.

Figure 6C:
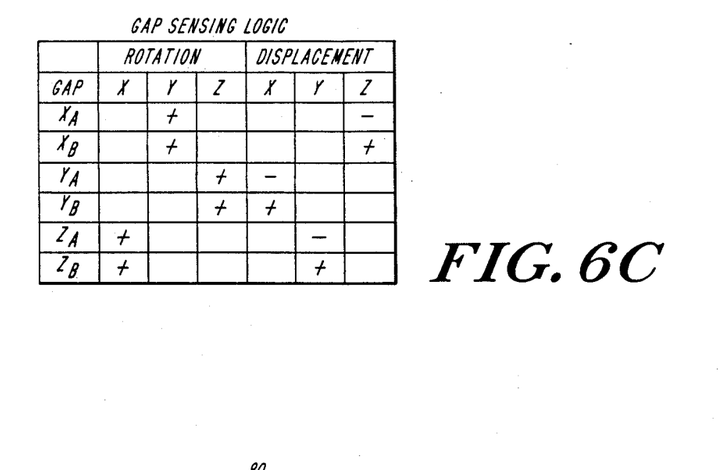
FIG. 6c illustrates gap sensing function required for measuring motion in six degrees of freedom.

FIG. 6c illustrates the gap sensor signal sense (+ or −) generated by the six gap sensors in response to rotation or displacement of the stable member in a six degree-of-freedom actuator/isolator system. In response to displacement of the stable member in the +X direction, for example, gap sensor $Y_A$ produces a negative output signal, and gap sensor $Y_B$ produces a positive output signal.

Figure 7:
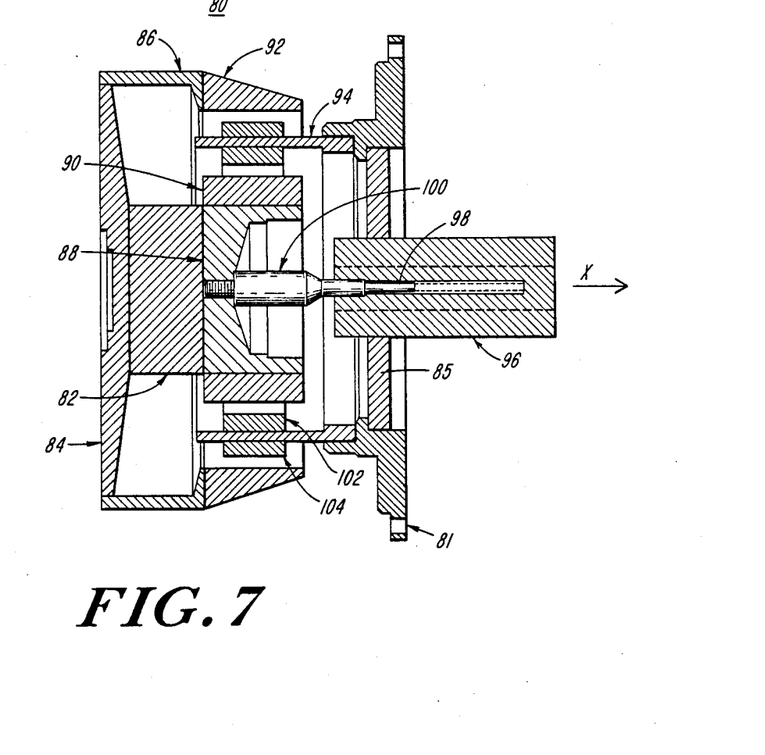
FIG. 7 is a sectional view of another embodiment of an actuator and gap sensor configuration according to the invention.

In a preferred embodiment of the invention, the gap sensing and isolator/actuator functions are integrated into a single actuator/gap sensor unit. FIG. 7 is a sectional view of such an actuator/gap sensor according to the invention.

The actuator/isolator/gap sensor 80 of FIG. 7 is generally cylindrical in shape, and offers the advantage of relatively high efficiency, due to the location of all the conductor elements within the permanent magnetic field. This configuration also provides inherent shielding of the conducting coils by the surrounding magnetic assembly. Leakage fields are limited to the air-gap surfaces and eddy-current forces are produced only by axial coil motion.

As FIG. 7 illustrates, back plate 84 is mounted on the stable member, while flange 81 is mounted on the "noisy" case structure. Return ring 86 is affixed to back plate 84, and outer ring 92 is attached to return ring 86. Permanent magnet 82 is affixed to back plate 84. A stator coil assembly, including inner stator coil 102 and outer stator coil 104, is supported by support sleeve 94. Support sleeve 94, generally cylindrical in form, is affixed at one end to flange 81, and passes through the inner diameter of outer ring 92.

Outer stator coil 104 is mounted to the outer surface of coil support sleeve 94, while inner stator coil 102 is mounted to the inner surface of coil support sleeve 94. Inner ring 90 receives the distal end of LVDT support shaft 100, while the generally cylindrical body of LVDT gap sensor 96 passes through plate 85 substantially coaxial with flange 81 and return ring 86.

Accordingly, while some of the embodiments described above include permanent magnet elements mounted on the "noisy" base or case structure, the further preferred embodiment illustrated in FIG. 7 contains a permanent magnet element mounted on the stable member. As discussed above, placing the magnets of the actuator/isolators on the stable member and the conductors on the base adds desirable stabilizing inertia to the stable member, and enhances electrical accessibility to the conductors from base mounted current output amplifiers.

The magnetic assembly for the construction shown in FIG. 7 preferably employs a samarium-cobalt permanent magnet 82. Back plate 84, return ring 86 and inner core 88 are vanadium-permendur, and the inner ring 90 and outer ring 92 are a ferrite material.

The stator coil assembly preferably consists of a total of ten thousand turns of No. 40 copper wire, configured as twelve parallel coils and supported by berylium-oxide support sleeve 94. The isolator/actuator/gap sensor 80 of FIG. 7 is capable of producing a force of twenty-five Newtons for one ampere of coil current. Eddy current force is less than one dyne for a peak displacement of 250 micro-cm at 100 Hz.

The LVDT gap sensor 96 is mounted on actuator/isolator 80, thus producing a single assembly capable of performing the dual functions of electromagnetic suspension and position sensing. Combining these functions into one unit greatly simplifies assembly and alignment procedures, and provides a measurement of stable member displacement at each point of suspension force application. This displacement measurement is along the axis of the applied force for each isolator/actuator.

A free-moving, rod-shaped, high permeability, nickel-iron magnetic core 98 is attached to the isolator/actuator magnet assembly 82 via the non-magnetic support shaft 100. The portion of the LVDT 96 which is attached to the stator coil support sleeve 94 consists of a inner stator coil 102 and an outer stator coil 104 symmetrically spaced on a cylindrical form. Relative axial motion of the core 98 inside the cylindrical coil assembly provides a moving path for the magnetic flux linking the LVDT coils. An axial sensitivity of 40 volts DC per centimeter of displacement can be achieved in this configuration. Concurrently, elastic restraint force by the LVDT 96 is less than 5 dynes for displacements of 0.25 centimeters from the null position.

It will thus be seen that the invention efficiently attains the objects set forth above, among those made apparent from the preceding description. It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by letters patent is:

1. An electromagnetic suspension system for suspending a platform element with respect to a base element, and for isolating said platform element from vibration propagated through said base element, comprising:
   an electromagnetic isolator/actuator, said isolator including
   (i) permanent magnet means, affixed to said base element, for creating a magnetic field, said permanent magnet means including a permanent magnet having North and South magnetic poles, a pole gap between said North and South poles, and a polar axis defined by a line passing through said North and South poles, and
   (ii) conductor coil means, affixed to said platform element, for carrying an electric current applied thereto, said conductor coil means including a conductor coil having turns of electrically conductive material, at least a portion of each of said turns being situated within said pole gap of said permanent magnet, said portion being aligned substantially perpendicularly to said polar axis of said permanent magnet, so that when electric current is applied to said conductor coil means, a force is generated between said conductor coil means and said permanent magnet means, said force being proportional to said current and substantially independent of relative velocity of motion between said conductor coil means and said permanent magnet means.

2. An electromagnetic suspension system according to claim 1, further comprising n isolator/actuators, where n is a positive integer, said n isolator/actuators being disposed about said platform element for suspending said platform element and isolating said platform element from vibration in degrees of freedom of motion.

3. An electromagnetic suspension system according to claim 1, wherein isolator/actuators are oppositely disposed about said platform element along orthogonal X, Y and Z coordinate axes, for suspending said platform element and isolating said platform element from vibration in six degrees of freedom of motion in an XYZ coordinate system.

4. An electromagnetic suspension system according to claim 3, further comprising actuator means, in electrical circuit with said isolator/actuators, for actuating movement of said platform element relative to said base in six degrees of freedom, said actuator means including means for selectively applying a controlled actuator current to each said induction coil of each said isolator/actuator.

5. A system according to claim 4, further comprising gap sensing means, in circuit with respective ones of said conductor coils, for (i) sensing gap distances between the portion of each of said conductor coils situated within the pole gap of a corresponding permanent magnet and the poles of said magnet, and (ii) generating electrical gap signals representative of said gaps between said conductor coil portions and said respective corresponding polls.

6. A system according to claim 5, further comprising suspension control logic means, in circuit with said acuator means, responsive to said gap signals, for controlling actuator current applied to respective ones of said conductor coils.

7. A system according to claim 6, further comprising angular accelerometer means, in circuit with said suspension control logic means, for (i) measuring angular acceleration of said platform element, and (ii) transmitting to said suspension control logic control signals representative of said angular acceleration.

8. An electromagnetic suspension system for suspending a platform element with respect to a base element, and for isolating said platform element from vibration propagated through said base element, comprising:
   an electromagnetic isolator/actuator, said isolator including
   (i) permanent magnet means, affixed to said platform element, for creating a magnetic field, said permanent magnet means including a permanent magnet having North and South magnetic poles, a pole gap between said North and South poles, and a polar axis defined by a line passing through said North and South poles, and
   (ii) conductor coil means, affixed to said base element, for carrying an electric current applied thereto, said conductor coil means including a conductor coil having turns of electrically conductive material, at least a portion of each of said turns being situated within said pole gap of said permanent magnet, said portion being aligned substantially perpendicularly to said polar axis of said permanent magnet, so that when electric current is applied to said conductor coil means, a force is generated between said conductor coil means and said permanent magnet means, said force being proportional to said current and substantially independent of relative velocity of motion between said conductor coil means and said permanent magnet means.

9. An electromagnetic suspension system according to claim 8, further comprising n isolator/actuators, where n is a positive integer, said n isolator/actuators being disposed about said platform element for suspending said platform element and isolating said platform element from vibration in n degrees of freedom of motion.

10. An electromagnetic suspension system according to claim 8, wherein isolator/actuators are oppositely disposed about said platform element along orthogonal X, Y and Z coordinate axes, for suspending said platform element and isolating said platform element from vibration in six degrees of freedom of motion in an XYZ coordinate system.

11. An electromagnetic suspension system according to claim 10, further comprising actuator means, in electrical circuit with said isolator/actuators, for actuating movement of said platform element relative to said base in six degrees of freedom, said actuator means including means for selectively applying a controlled actuator current to each said induction coil of each said isolator/actuator.

12. A system according to claim 11, further comprising gap sensing means, in circuit with respective ones of said conductor coils, for (i) sensing gap distances between the portion of each of said conductor coils situated within the pole gap of a corresponding permanent magnet and the poles of said magnet, and (ii) generating electrical gap signals representative of said gaps between said conductor coil portions and said respective corresponding polls.

13. A system according to claim 12, further comprising suspension control logic means, in circuit with said actuator means, responsive to said gap signals, for controlling actuator current applied to respective ones of said conductor coils.

14. A system according to claim 13, further comprising angular accelerometer means, in circuit with said suspension control logic means, for (i) measuring angular acceleration of said platform element, and (ii) transmitting to said suspension control logic control signals representative of said angular acceleration.

* * * * *

UNITED STATES PATENT AND TRADEMARK OFFICE
CERTIFICATE OF CORRECTION

PATENT NO. : 4,849,666

DATED : 18 July 1989

INVENTOR(S) : David G. Hoag

It is certified that error appears in the above-identified patent and that said Letters Patent is hereby corrected as shown below:

Column 2, line 31, delete "th" and insert --the--.

Column 3, line 19, after "schematic" insert --diagram--.

Column 3, line 57, delete "e1ements" and insert --elements--.

Column 8, line 18, delete "ccntrol" and insert --control--.

Column 10, line 24, delete "manitude" and insert --magnitude--.

UNITED STATES PATENT AND TRADEMARK OFFICE
CERTIFICATE OF CORRECTION

PATENT NO. : 4,849,666

DATED : 18 July 1989

INVENTOR(S) : David G. Hoag

It is certified that error appears in the above-identified patent and that said Letters Patent is hereby corrected as shown below:

Column 12, line 68, after "in" insert --n--.

Signed and Sealed this

Tenth Day of March, 1992

Attest:

HARRY F. MANBECK, JR.

Attesting Officer      Commissioner of Patents and Trademarks